United States Patent [19]
Cunningham, Edward V. et al.

[11] Patent Number: 5,445,240
[45] Date of Patent: Aug. 29, 1995

[54] PERMANENT MAGNET ASSEMBLY

[76] Inventors: Cunningham, Edward V., 5040 McCarty Rd., Saginaw, Mich. 48603; Joel E. Birsching, 5833 Bay Park, Unionville, Mich. 48767

[21] Appl. No.: 285,682

[22] Filed: Aug. 4, 1994

[51] Int. Cl.⁶ .............................................. B62D 5/08
[52] U.S. Cl. .................................. 180/132; 180/142; 180/149
[58] Field of Search ...................... 180/132, 142, 149

[56] References Cited

U.S. PATENT DOCUMENTS 5,119,898 6/1992 Eckhardt et al. .................... 180/142

Primary Examiner—Mitchell J. Hill
Attorney, Agent, or Firm—Saul Schwartz

[57] ABSTRACT

A permanent magnet assembly for an electromagnetic mechanism in a motor vehicle power steering gear includes a metal ring having a plurality of radially oriented permanent magnets defined thereon and a plastic retaining hub attached to the metal ring. The metal ring has an annular end wall, an internal annular shoulder facing the opposite direction from the end wall, and a plurality of V-shaped notches in the end wall. Each V-shaped notch has a pair of flat sides converging at a linear junction tipped back from the plane of the annular end wall. A plastic retaining hub is formed by injection molding plastic in a mold cavity to which the end wall of the metal ring is exposed so that, upon curing of the injection molded plastic, the end wall of the metal ring is seated against an annular side of a socket in a rim of the retaining hub, integral V-shaped lugs on the retaining hub protrude into the V-shaped notches, and a lip of the retaining hub closes behind the internal annular shoulder. Dimensional shrinkage of the plastic retaining hub during curing effects a frictional driving connection between the metal ring and the plastic retaining hub and wedges the V-shaped lugs into the V-shaped notches.

3 Claims, 4 Drawing Sheets

PERMANENT MAGNET ASSEMBLY

FIELD OF THE INVENTION

This invention relates to a permanent magnet assembly for an electromagnetic mechanism in a motor vehicle power steering gear.

BACKGROUND OF THE INVENTION

U.S. Pat. No. 5,119,898, issued 9 Jan. 1992 and assigned to the assignee of this invention, describes a hydraulic power steering system manufactured by the assignee of this invention, General Motors Corporation, and identified by the tradename MAGNASTEER, including a steering gear in which an electromagnetic mechanism is selectively operable to vary the performance characteristics of a conventional proportional control valve of the steering gear. The proportional control valve includes a valve spool connected to a steering wheel, a valve body around the valve spool connected to a pair of steered wheels, and a torsion bar which resiliently centers the valve spool relative to the valve body. Variable flow area throttling orifices formed between the valve body and valve spool regulate a steering assist boost pressure as a function of the amount of twist of the torsion bar which, in turn, is proportional to the manual effort applied at the steering wheel. A rotary magnetic circuit of the electromagnetic mechanism includes a pair of pole pieces which rotate with the valve body and a permanent magnet assembly which rotates with the valve spool. A stationary exciting coil of the electromagnetic mechanism cooperates with the rotary magnetic circuit to vary the centering force of the torsion bar when the coil is energized. A permanent magnet assembly according to this invention is an improvement relative to the permanent magnet assembly described in the aforesaid U.S. Pat. No. 5,119,898 and embodied in the steering gear of the aforesaid MAGNASTEER steering system.

SUMMARY OF THE INVENTION

This invention is a new and improved permanent magnet assembly for an electromagnetic mechanism in a motor vehicle power steering gear including a sintered, powdered metal ring having a plurality of radially oriented permanent magnets defined thereon and a plastic retaining hub attached to the metal ring. The metal ring has an annular end wall and is relieved behind the end wall to define an internal shoulder facing the opposite direction from the end wall. Each of a plurality of V-shaped notches in the end wall has a pair of flat sides intersecting at a substantially linear junction tipped back from the plane of the annular end wall at a predetermined included angle in the range of between about 06 degrees and 08 degrees. The plastic retaining hub has a tubular center portion, an annular web, and a rim connected to the center portion by the web. The plastic retaining hub is formed by injection molding plastic in a mold cavity to which the end wall of the metal ring is exposed so that, upon curing of the injection molded plastic, the metal ring is seated in an annular socket in the rim. The socket bears against the end wall of the ring and is closed behind the internal shoulder thereof. The socket has integral V-shaped lugs formed by plastic which cures in the V-shaped notches. Dimensional shrinkage of the plastic retaining hub during curing causes the annular socket to clamp tightly against the internal shoulder and against the end wall of the metal ring to effect a frictional driving connection between the metal ring and the plastic retaining hub. Dimensional shrinkage during curing also causes the V-shaped lugs to wedge into the tipped-back, V-shaped notches so that the rim of the plastic retaining hub is preloaded or pressed radially and axially against the metal ring in shrink-fit fashion. The angle by which the V-shaped notches are tipped back is calculated to sustain radial preload throughout the operating temperature range of the steering gear without exceeding the radial bearing capability of the sintered, powdered metal ring when the steering gear is cold.

DESCRIPTION OF A PREFERRED EMBODIMENT

Figure 1:
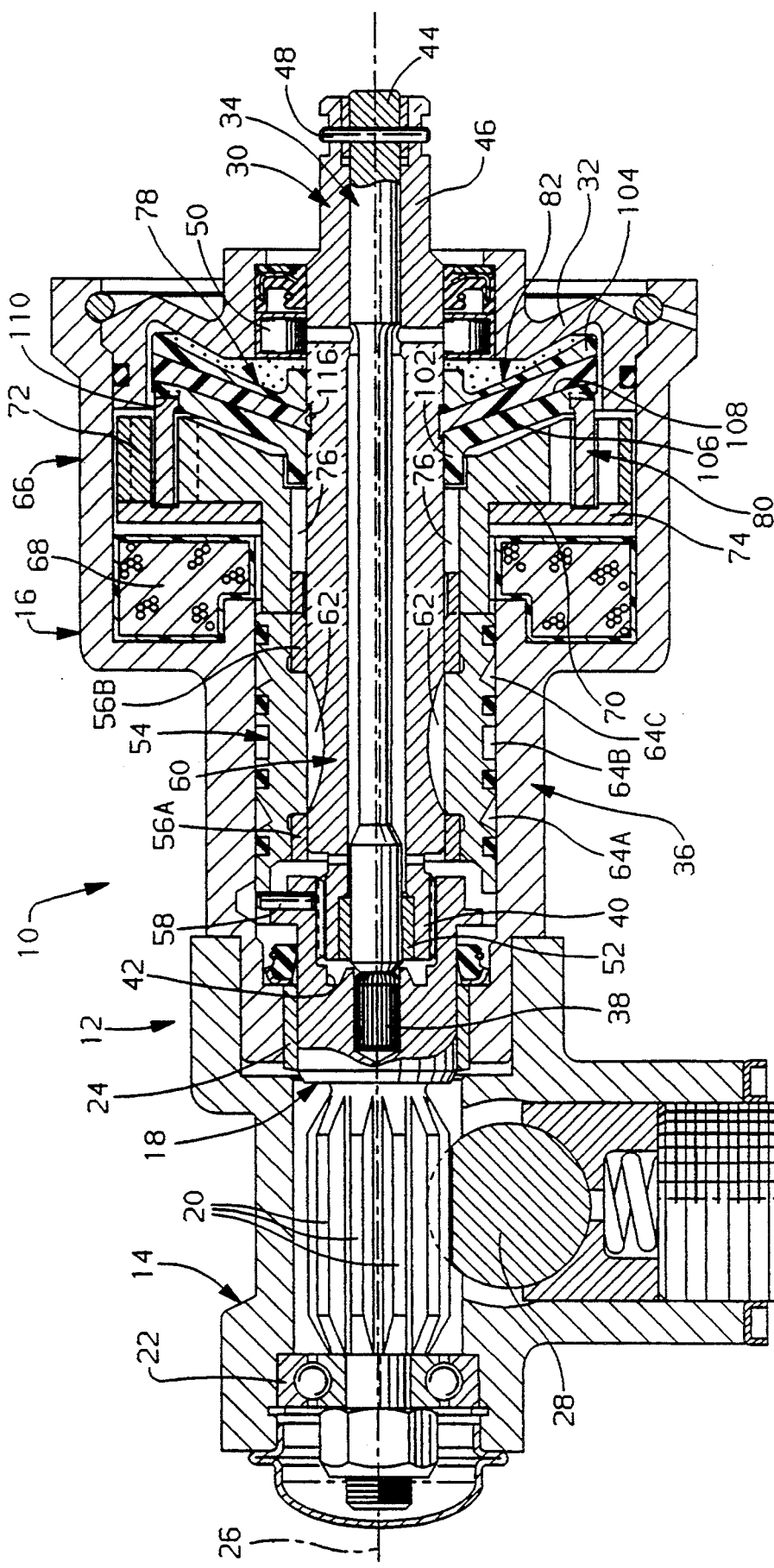
FIG. 1 is a longitudinal sectional view of a motor vehicle power steering gear having a permanent magnet assembly according to this invention.

Referring to FIG. 1, a motor vehicle power steering gear 10, such as described in the aforesaid U.S. Pat. No. 5,119,898, has a composite housing 12 consisting of a rack housing 14 and a valve housing 16. A pinion head 18 having a plurality of gear teeth 20 thereon is supported on the rack housing 14 by a roller bearing 22 and by a sleeve bearing 24 for rotation about a centerline 26 of the composite housing 12. A rack bar 28 having a plurality of rack teeth meshing with the gear teeth 20 on the pinion head is supported on the rack housing 14 for bodily movement perpendicular to the centerline 26 in response to rotation of the pinion head. The ends of the rack bar, not shown, are connected to steerable wheels of the motor vehicle in conventional fashion.

A tubular input or stub shaft 30 of the steering gear protrudes into the valve housing 16 through a cover 32 on the valve housing. A torsion bar 34 of a proportional control valve 36 of the steering gear 10 is disposed inside the stub shaft 30. Representative proportional control valves are described in U.S. Pat. Nos. 4,454,801 and 3,022,772, issued 19 Jun. 1984 and 27 Feb. 1962, respectively, and assigned to the assignee of this invention. The torsion bar has an inboard end 38 protruding beyond a corresponding inboard end 40 of the stub shaft force fitted in a serrated bore inside a counterbore 42 in the pinion head 18. The torsion bar 34 has an outboard end 44 rigidly connected to the stub shaft 30 at an outboard end 46 of the latter by a pin 48.

The outboard end 44 of the stub shaft is connected to a steering wheel, not shown, of the motor vehicle for rotation as a unit therewith. The stub shaft is supported on the composite housing 12 for rotation about the centerline 26 independent of the pinion head by a roller bearing 50 and by a sleeve bearing 52 between the torsion bar and the stub shaft. A lost motion connection in the counterbore 42 permits about 7 degrees of relative angular movement between the pinion head and the stub shaft.

The proportional control valve 36 of the steering gear 10 further includes a tubular valve body 54 having a pair of rings 56A-B thereon supporting the valve body on the stub shaft 30 for rotation about the centerline 26 independent of the stub shaft. The valve body is connected by a pin 58 to the pinion head for rotation as a unit therewith. A valve spool 60 of the proportional control valve 36 is defined on the part of the stub shaft 30 inside the valve body and includes a plurality of arc-shaped slots 62 facing a plurality of internal grooves, not shown, in the valve body and cooperating therewith in defining a plurality of variable area throttling orifices. A plurality of outside annular grooves 64A-C on the valve body 54 are isolated from each other by seal rings slidably engaging the wall of the valve housing. The grooves 64A,64C are connected to opposite working chambers, not shown, of a steering assist fluid motor. The groove 64B is connected to a pump, not shown.

The torsion bar defines an open-center position of the valve spool relative to the valve body in which all of the throttling orifices are equally open and fluid circulates freely from the groove 64B to a drain, not shown, connected to a reservoir. When the valve spool is rotated relative to the valve body by manual effort applied at the steering wheel, one half of the throttling orifices become smaller and regulate a steering assist boost pressure in a corresponding one of the grooves 64A,64C and one half of the throttling orifices become larger for unobstructed drainage of fluid from the other of the grooves 64A,64C to the reservoir. The flow area of the smaller throttling orifices is proportional to the amount of twist between the outboard end 38 of the torsion bar and the inboard end 44 thereof. The centering force of the torsion bar 34 resisting such twist is the manual effort sensed by the operator through the steering wheel.

An electromagnetic mechanism 66 of the steering gear 10 varies the effective centering force of the torsion bar to change the level of steering assist, i.e. steering assist boost pressure, achieved for a given manual steering input applied at the steering wheel of the motor vehicle. A stationary magnetic circuit of the electromagnetic mechanism 66 includes an encapsulated annular exciting coil 68 rigidly attached to the valve housing 16. A rotary magnetic circuit of the electromagnetic mechanism 66 includes an inner pole piece 70 rotatably journaled on the stub shaft 30 and an outer pole piece 72 rigidly connected to the inner pole piece by a ring 74 in a plane perpendicular to the centerline 26. The inner pole piece has a plurality of internal slots 76 which mesh with teeth, not shown, on the ring 56B on the valve body whereby the pole pieces 70,72 are rotatable as a unit with the valve body 54.

Figure 3:
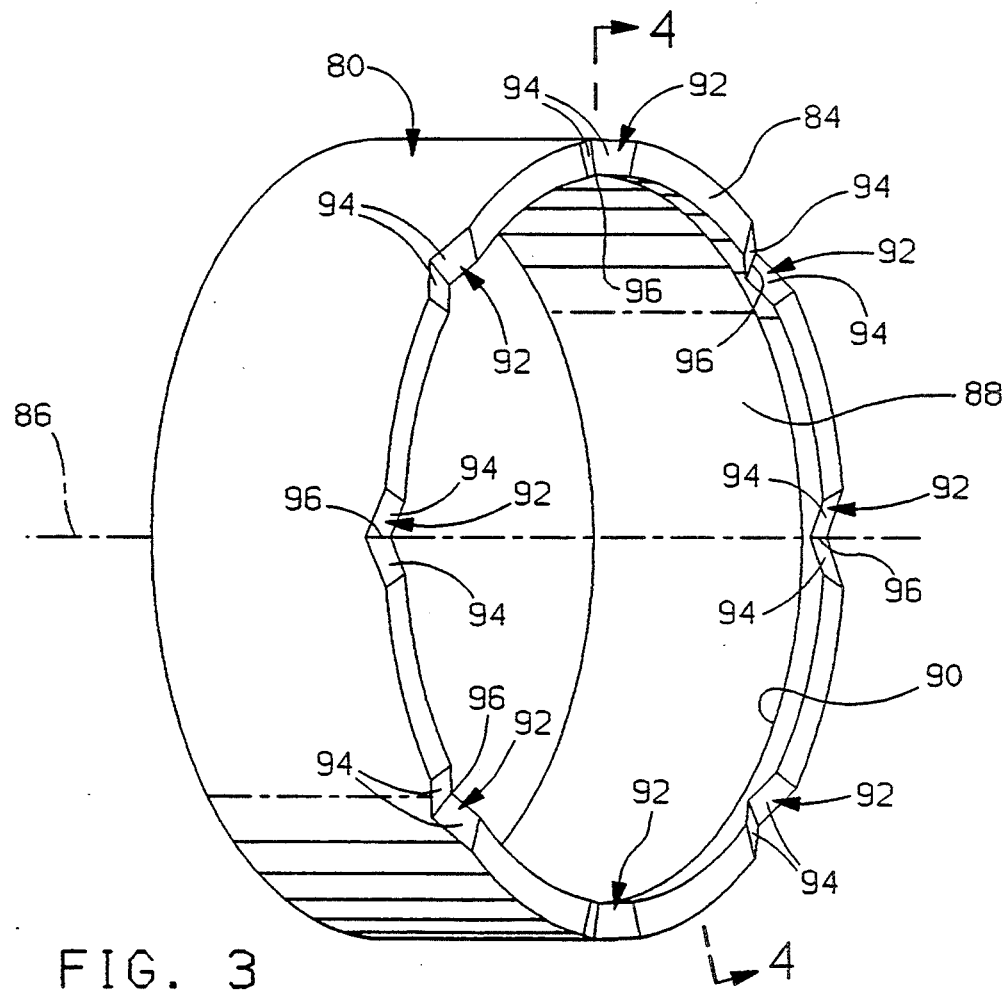
FIG. 3 is a perspective view of a portion of the permanent magnet assembly according to this invention.
Figure 4:
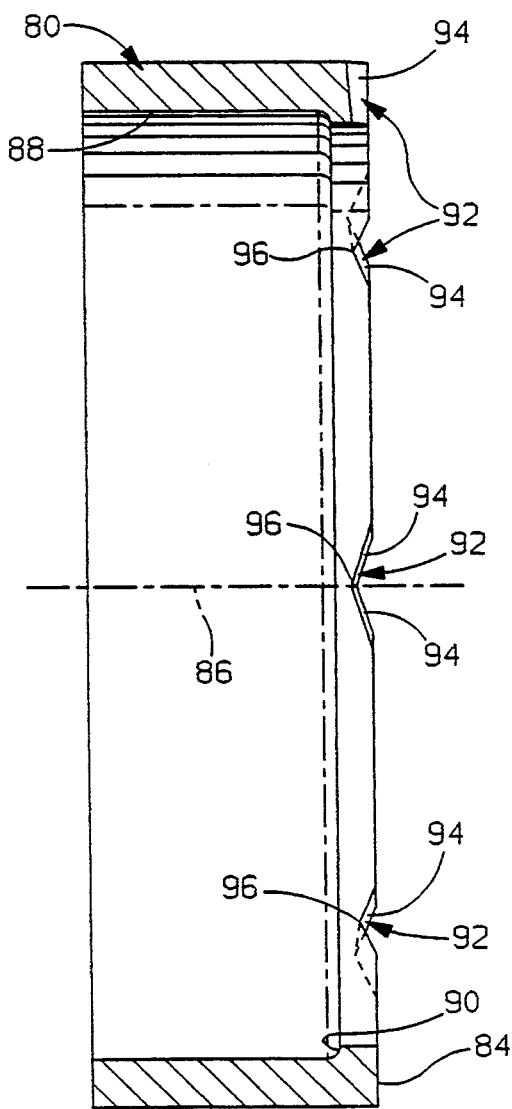
FIG. 4 is a sectional view of taken generally along the plane indicated lines 4—4 in FIG. 3.
Figure 5:
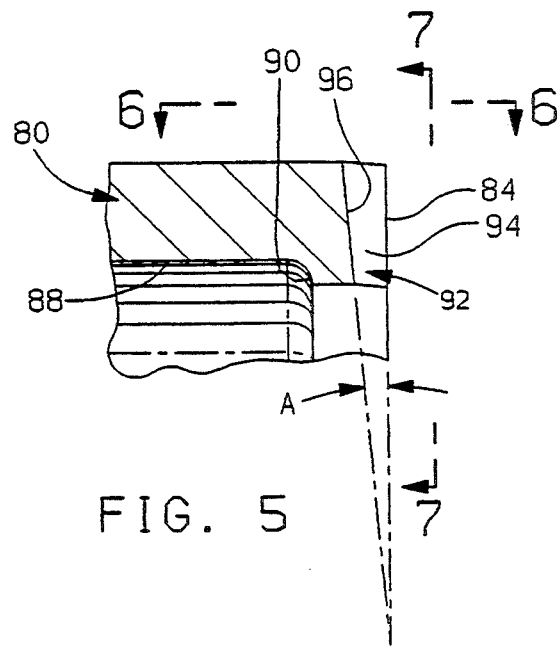
FIG. 5 is an enlarged view of a portion of FIG. 4.
Figure 6:
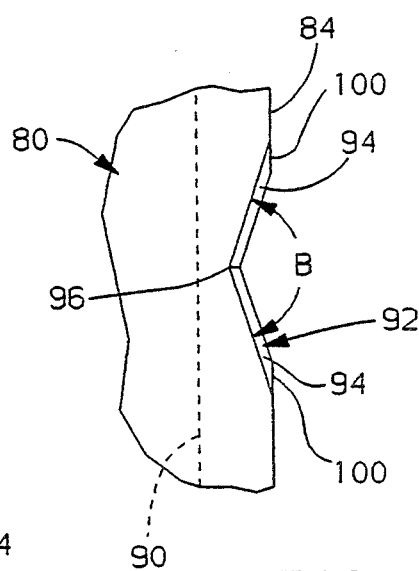
FIG. 6 is a view of taken generally along the plane indicated lines 6—6 in FIG. 5.
Figure 7:
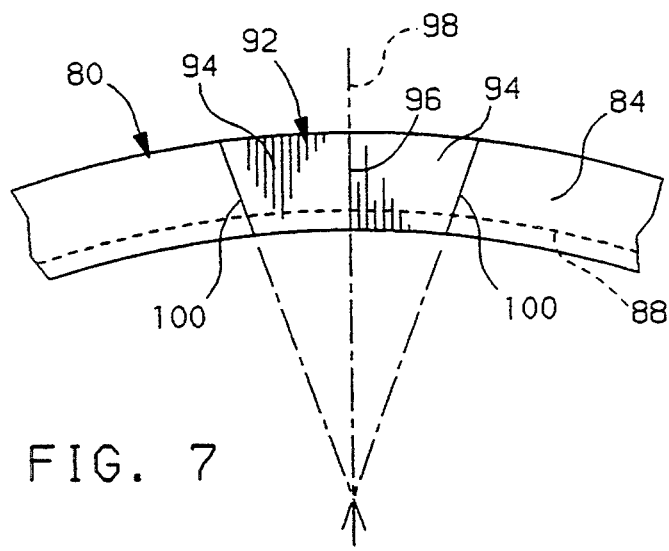
FIG. 7 is a view of taken generally along the plane indicated lines 7—7 in FIG. 5.

The rotary magnetic circuit further includes a permanent magnet assembly 78 according to this invention consisting of a cylindrical metal ring 80 between the inner and outer pole pieces 70,72 and a plastic retaining hub 82 between the ring 80 and the stub shaft 30. The metal ring is made of sintered powdered metal and includes an annular end wall 84 in a plane perpendicular to a centerline 86 of the ring, FIGS. 3-4. An inner cylindrical wall 88 of the ring 80 is relieved behind the end wall 84 to define an annular shoulder 90 on the inner wall facing in the opposite direction from the end wall. A plurality of radially oriented permanent magnets, not shown, are formed on the metal ring by exposing the ring to strong, externally created magnet fields.

As seen best in FIGS. 3-7, a plurality of V-shaped notches 92 are formed in the end wall 84 of the metal ring 80. The notches are evenly angularly spaced around the end wall and each includes a pair of flat sides 94 which converge at a linear junction 96 in a radial plane 98, FIG. 7. While the junction 96 is illustrated as a sharp intersection, a radius of about 1.5 mm between the flat sides 94 has been found desirable for minimizing stress concentrations in the metal ring. Each of the linear junctions 96 is tipped back from the plane of the end wall 84 at an angle "A", FIG. 5, in a range of between about 06 degrees and 08 degrees. An angle "B", FIG. 6, intercepted between the flat sides 94 of each of the notches 92 is preferably in a range of between 135 degrees and 145 degrees. The flat sides 94 of each notch intersect the end wall 84 at a pair of outside edges 100, FIGS. 6-7, and are tipped back due to the angle of inclination "A" of the linear junction 96.

Figure 2:
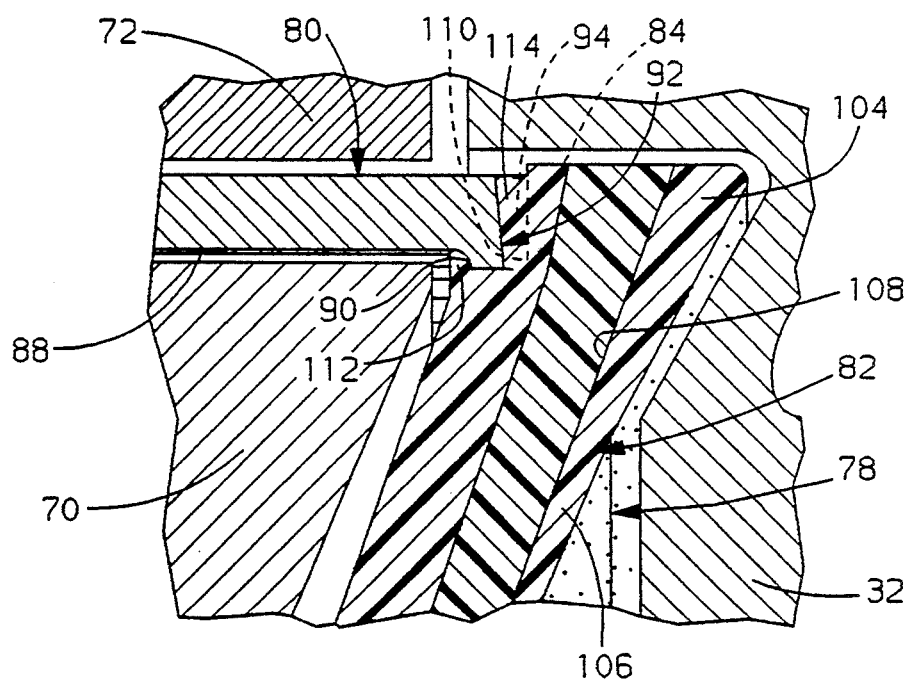
FIG. 2 is an enlarged view of a portion of FIG. 1.

As seen best in FIGS. 1-2, the plastic hub has a tubular center part 102, a rim 104, and a generally annular web 106 between the rim and the center part. An internal passage 108 in the plastic hub 82 has an outboard end open from outside the rim and an inboard end open from inside the tubular center part 102. The plastic hub 82 is formed by injection molding plastic in a mold cavity to which the end wall 84 of the metal ring 80 is exposed so that, upon curing, the end wall 84 is seated in a socket in the rim 104 having an annular shoulder 110 juxtaposed the end wall 84 and an annular lip 112 closed behind the annular shoulder 90. In addition, a plurality of integral V-shaped lugs 114 seated in and conforming in shape to respective ones of the V-shaped notches 92 are formed on the plastic hub 82 by plastic which cures in the V-shaped notches during the molding operation.

The center part 102 of the plastic hub is closely received on the stub shaft 30 with an irregularly shaped annular groove 116 in the latter exposed to the inboard ends of the passages 108. Plastic is injection molded in the passages 108 and the groove 116 and, when cured, effects a rigid driving connection between the stub shaft and the plastic hub. Magnetic flux created by energization of the exciting coil 68 is concentrated by the inner and outer pole pieces 70,72 and interacts with the radially oriented permanent magnets on the metal ring 80 to induce a force couple between the pinion head 18 and the stub shaft 30. Depending upon the direction of current flow in the exciting coil and the direction of applied manual effort at the steering wheel, the induced force couple either increases or reduces the centering force of the torsion bar.

When the plastic from which the hub is formed cures, it also shrinks dimensionally relative to the metal ring 80 in the direction of the centerline 86, i.e. axially, and perpendicular to the centerline 86, i.e. radially. Axial shrinkage presses the lip 112 of the plastic hub tightly against the internal shoulder 90 on the ring and the shoulder 110 tightly against the end wall 84 on the ring to eliminate any axial clearance between the ring and the hub. Friction between the surfaces pressed together by such dimensional shrinkage effects a driving connection between the ring and hub for unitary rotation about the centerline 86.

Axial and radial shrinkage of the plastic from which the hub is formed also wedges each V-shaped lug 114 into the corresponding V-shaped notch 92 so that axial and radial clearance between the lugs and the notches is eliminated. The net force reaction of each V-shaped lug on each V-shaped notch has an axial vector component in the direction of centerline 86 and a radial vector component perpendicular to centerline 86. The relative magnitudes of the radial and axial vector components depends upon the magnitude of the angle "A" by which the linear junctions 96 are tipped back from the plane of the annular end 84 of the metal ring. As the magnitude of the angle "A" increases, the magnitude of the radial vector component increases and the magnitude of the linear vector component decreases.

Figure 8:
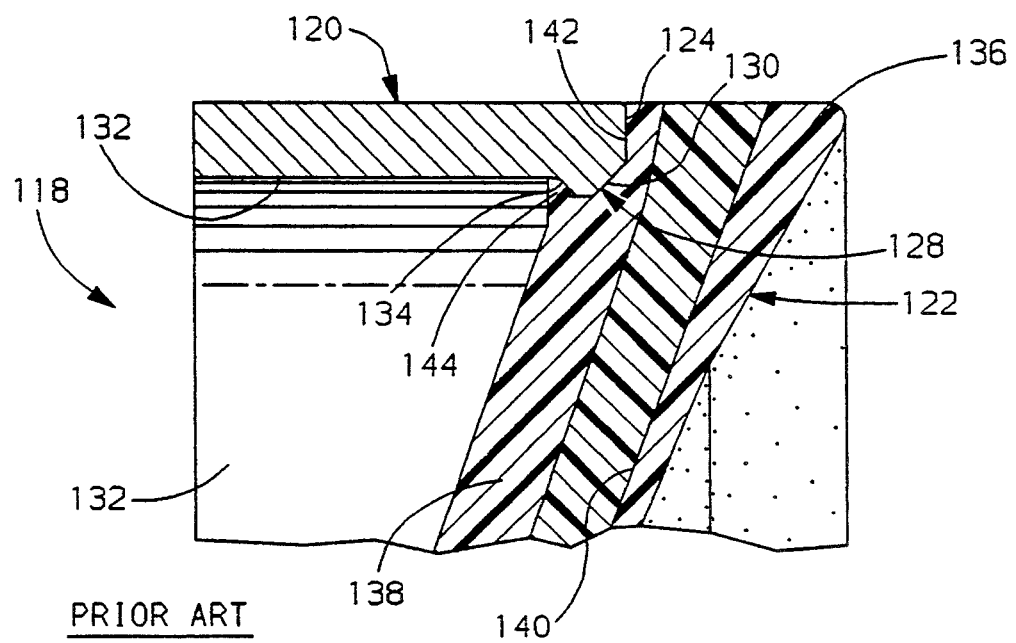
FIG. 8 is similar to FIG. 2 showing a portion of a prior permanent magnet assembly of a motor vehicle power steering gear.
Figure 9:
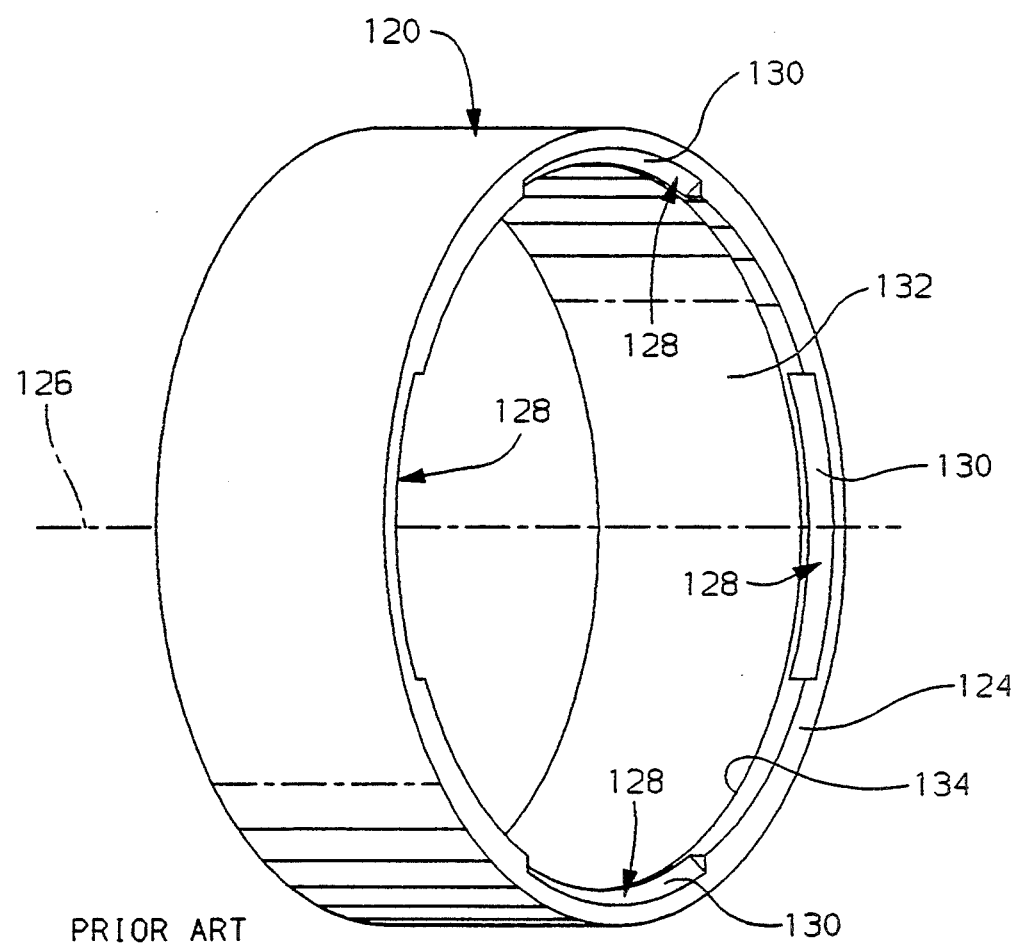
FIG. 9 is similar to FIG. 3 showing the corresponding portion of the prior permanent magnet assembly.

The metal ring 80, being made of sintered powdered metal, is susceptible to fracture if the aforesaid radial vector component at each V-shaped notch 92 has a magnitude above a predetermined maximum. Conversely, because the plastic from which the hub 122 is made expands relative to the metal ring 80 with increasing operating temperature, the V-shaped lugs 114 may separate from the V-shaped notches 92 if the magnitudes of the aforesaid radial vector components do not exceed a predetermined minimum at ambient temperature. The angle "A" is selected to achieve radial vector components having magnitudes in a range between the aforesaid predetermined maximum and minimum. Therefore, at ambient temperature when the magnitudes of the shrinkage induced radial vector components are maximum, the structural integrity of the metal ring is assured and at maximum operating temperature when the thermal growth of the hub 122 relative to the metal ring is maximum, the V-shaped lugs 92 remain seated in the V-shaped notches without axial or radial clearance therebetween. The permanent magnet assembly 78 according to this invention is contrasted with a permanent magnet assembly 118, FIGS. 8–9, of a prior motor vehicle power steering gear, not shown, which is otherwise structurally and functionally identical to the steering gear 10 described above. The prior permanent magnet assembly 118 includes a cylindrical metal ring 120 and a plastic retaining hub 122. The metal ring is made of sintered powdered metal and includes an annular end wall 124 in a plane perpendicular to a centerline 126 of the ring. A plurality of wide notches 128 are formed in the end wall 124, each having a flat side 130 facing inward toward the centerline 126. An inner wall 132 of the ring 120 is relieved behind the end wall 124 to define an annular lip 134 facing in the opposite direction from the end wall.

The plastic hub 122 has a tubular center part, not shown, corresponding to the center part 102 of the permanent magnet assembly 78, a rim 136, and a generally annular web 138 between the rim and the center part. The center part is closely received on a stub shaft, not shown, corresponding to the stub shaft 30 and an internal passage 140 is formed in the hub for injection molding plastic between the permanent magnet assembly 118 and the stub shaft.

The plastic retaining hub 122 is formed by injection molding plastic in a mold cavity to which the end wall 124 of the metal ring 120 is exposed so that, upon curing, the end wall 124 is seated in an annular socket in the rim having an annular shoulder 142 juxtaposed the end wall and an annular lip 144 closed behind the annular lip 134. As described above with respect to the permanent magnet assembly 78, dimensional shrinkage of the plastic from which the retaining hub 122 is molded operates to tightly clamp the retaining hub to the metal ring 120 in the direction of the centerline 126. The integral plastic lugs formed by plastic which cures in the elongated notches 128 during the molding operation may, however, experience radial separation from the notches 128 due to dimensional shrinkage and to the inward facing orientation of the notches 128.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A permanent magnet assembly for an electromagnetic mechanism in a motor vehicle power steering gear comprising:

a cylindrical metal ring having an annular end wall in a plane perpendicular to a longitudinal centerline of said ring and an internal annular shoulder facing in a direction opposite said annular end wall, means defining a plurality of V-shaped notches in said annular end wall of said metal ring each having a pair of flat sides separated by a first angle and converging at a linear junction tipped back from said plane of said annular end wall at a second angle, and a plastic retaining hub molded around a portion of said cylindrical metal ring so that an annular shoulder on said retaining hub is juxtaposed said annular end wall on said metal ring and a lip on said retaining hub is juxtaposed said internal annular shoulder on said metal ring and a plurality of integral V-shaped lugs on said retaining hub are each seated in a corresponding one of said V-shaped notches in said metal ring, dimensional shrinkage of the plastic from which said retaining hub is formed which occurs as such plastic cures being operative to axially clamp said metal ring between said annular shoulder and said lip on said retaining hub and to wedge each of said V-shaped lugs into said corresponding one of said V-shaped notches.

2. The permanent magnet assembly recited in claim 1 wherein:

said second angle is between about 06 degrees and 08 degrees.

3. The permanent magnet assembly recited in claim 2 wherein:

said first angle is between about 135 degrees and 145 degrees.

* * * * *